United States Patent

Loh et al.

[15] 3,701,108

[45] Oct. 24, 1972

[54] CODE PROCESSOR FOR VARIABLE-LENGTH DEPENDENT CODES

[72] Inventors: Louis S. Loh, Mohegan Lake; Jacques H. Mommens, Briarcliff Manor; Josef Raviv, Ossining, all of N.Y.

[73] Assignee: International Business Machines Corporation, Armonk, N.Y.

[22] Filed: Oct. 30, 1970

[21] Appl. No.: 85,576

[52] U.S. Cl. ..........340/172.5

[51] Int. Cl. ..........G06f 5/00

[58] Field of Search ..........340/172.5; 235/157

[56] References Cited

UNITED STATES PATENTS

| | | | |
|---|---|---|---|
| 3,350,695 | 10/1967 | Kaufman et al. | 340/172.5 |
| 3,496,550 | 2/1970 | Schachner | 340/172.5 |
| 3,331,056 | 7/1967 | Lethin et al. | 340/172.5 |
| 3,440,615 | 4/1969 | Carter | 340/172.5 |
| 3,408,631 | 10/1968 | Evans et al. | 340/172.5 |
| 3,337,854 | 8/1967 | Cray et al. | 340/172.5 |

*Primary Examiner*—Paul J. Henon
*Assistant Examiner*—Mark Edward Nusbaum
*Attorney*—Hanifin and Jancin

[57] ABSTRACT

A processor for encoding fixed-length code words into variable-length code words and for decoding variable-length code words into fixed-length code words. The fixed-length code words are assigned to a number of groups and one of several possible coding sets determined by the probability of each word occurring after a preceding word. Each of the fixed-length code words is stored in a first associative memory unit along with its group number, its coding set assignment and a number of addresses arranged in groups. An input fixed-length code word is compared in the memory and will match the corresponding fixed-length stored word. One of the addresses is read out of the memory. The particular group from which the address is read out is determined by the group number of the previously received fixed-length code word. The selected address that is read out and the coding set membership, number of the previous word is entered into a second associative memory containing all the addresses arranged in several coding sets along with the variable-length code words. A match in the second memory unit on an address and a coding set number produces a variable-length code word for the input fixed-length code word. The first memory unit also provides the group number and coding set number for the next input fixed-length code word to be encoded. Decoding is performed in a similar but reverse manner starting with the variable-length coded data being entered into the second memory.

16 Claims, 13 Drawing Figures

| | 0 | 1 | 2 | 3 | 4 | GROUP | CODE SET |
|---|---|---|---|---|---|---|---|
| A | 1 | 3 | 6 | 12 | 11 | 0 | 0 |
| B | 2 | 1 | 9 | 1 | 9 | 1 | 0 |
| C | 9 | 4 | 7 | 10 | 10 | 4 | 1 |
| D | 3 | 5 | 10 | 2 | 1 | 0 | 0 |
| E | 8 | 12 | 11 | 3 | 2 | 4 | 1 |
| F | 4 | 2 | 8 | 11 | 3 | 3 | 1 |
| G | 7 | 8 | 12 | 4 | 4 | 1 | 0 |
| H | 5 | 11 | 5 | 8 | 8 | 2 | 0 |
| I | 10 | 6 | 4 | 5 | 5 | 2 | 0 |
| J | 6 | 7 | 3 | 6 | 6 | 2 | 0 |
| K | 12 | 10 | 2 | 7 | 7 | 4 | 1 |
| L | 11 | 9 | 1 | 9 | 12 | 2 | 0 |

| | LENGTH | CODE SET | ADDRESS |
|---|---|---|---|
| 11 | 2 | 0 | 1 |
| 01 | 2 | 0 | 2 |
| 101 | 3 | 0 | 3 |
| 100 | 3 | 0 | 4 |
| 0010 | 4 | 0 | 5 |
| 0011 | 4 | 0 | 6 |
| 00010 | 5 | 0 | 7 |
| 00011 | 5 | 0 | 8 |
| 00001 | 5 | 0 | 9 |
| 000001 | 6 | 0 | 10 |
| 0000001 | 7 | 0 | 11 |
| 0000000 | 7 | 0 | 12 |
| 1 | 1 | 1 | 1 |
| 011 | 3 | 1 | 2 |
| 010 | 3 | 1 | 3 |
| 00111 | 5 | 1 | 4 |
| 00101 | 5 | 1 | 5 |
| 00110 | 5 | 1 | 6 |
| 00100 | 5 | 1 | 7 |
| 00011 | 5 | 1 | 8 |
| 00010 | 5 | 1 | 9 |
| 00001 | 5 | 1 | 10 |
| 000001 | 6 | 1 | 11 |
| 000000 | 6 | 1 | 12 |

| | 0 | 1 | 2 | 3 | 4 | GROUP | CODE SET |
|---|---|---|---|---|---|---|---|
| A | 1 | 3 | 6 | 12 | 11 | 0 | 0 |
| B | 2 | 1 | 9 | 1 | 9 | 1 | 0 |
| C | 9 | 4 | 7 | 10 | 10 | 4 | 1 |
| D | 3 | 5 | 10 | 2 | 1 | 0 | 0 |
| E | 8 | 12 | 11 | 3 | 2 | 4 | 1 |
| F | 4 | 2 | 8 | 11 | 3 | 3 | 1 |
| G | 7 | 8 | 12 | 4 | 4 | 1 | 0 |
| H | 5 | 11 | 5 | 8 | 8 | 2 | 0 |
| I | 10 | 6 | 4 | 5 | 5 | 2 | 0 |
| J | 6 | 7 | 3 | 6 | 6 | 2 | 0 |
| K | 12 | 10 | 2 | 7 | 7 | 4 | 1 |
| L | 11 | 9 | 1 | 9 | 12 | 2 | 0 |

FIG. 1

| | LENGTH | CODE SET | ADDRESS |
|---|---|---|---|
| 11 | 2 | 0 | 1 |
| 01 | 2 | 0 | 2 |
| 101 | 3 | 0 | 3 |
| 100 | 3 | 0 | 4 |
| 0010 | 4 | 0 | 5 |
| 0011 | 4 | 0 | 6 |
| 00010 | 5 | 0 | 7 |
| 00011 | 5 | 0 | 8 |
| 00001 | 5 | 0 | 9 |
| 000001 | 6 | 0 | 10 |
| 0000001 | 7 | 0 | 11 |
| 0000000 | 7 | 0 | 12 |
| 1 | 1 | 1 | 1 |
| 011 | 3 | 1 | 2 |
| 010 | 3 | 1 | 3 |
| 00111 | 5 | 1 | 4 |
| 00101 | 5 | 1 | 5 |
| 00110 | 5 | 1 | 6 |
| 00100 | 5 | 1 | 7 |
| 00011 | 5 | 1 | 8 |
| 00010 | 5 | 1 | 9 |
| 00001 | 5 | 1 | 10 |
| 000001 | 6 | 1 | 11 |
| 000000 | 6 | 1 | 12 |

FIG. 2

INVENTORS
LOUIS S. LOH
JACQUES H. MOMMENS
JOSEF RAVIV

BY John J. Goodwin
ATTORNEY

CODE PROCESSOR FOR VARIABLE-LENGTH DEPENDENT CODES

BACKGROUND OF THE INVENTION

Field of the Invention

The present invention relates to data compaction and more particularly, to processors for encoding and decoding variable-length dependent codes.

SUMMARY OF THE INVENTION

An object of the present invention is to provide a code processor for encoding fixed-length code words into variable-length code words and for decoding variable-length code words into fixed-length code words.

Another object of the present invention is to provide a code processor wherein the code words are stored in code groups and coding sets and wherein the encoding or decoding of a word is dependent on a group number and coding set number determined by the previously encoded or decoded word.

Still another object of the present invention is to provide a code processor employing a three-state associative memory.

The foregoing and other objects, features and advantages of the invention will be apparent from the following more particular description of the preferred embodiments of the invention, as illustrated in the accompanying drawings.

BRIEF DESCRIPTION OF THE DRAWINGS

FIG. 1 is a diagram showing code words arranged in code groups.

FIG. 2 is a diagram showing variable-length code words arranged in coding sets.

DESCRIPTION OF THE PREFERRED EMBODIMENTS

Figure 3:
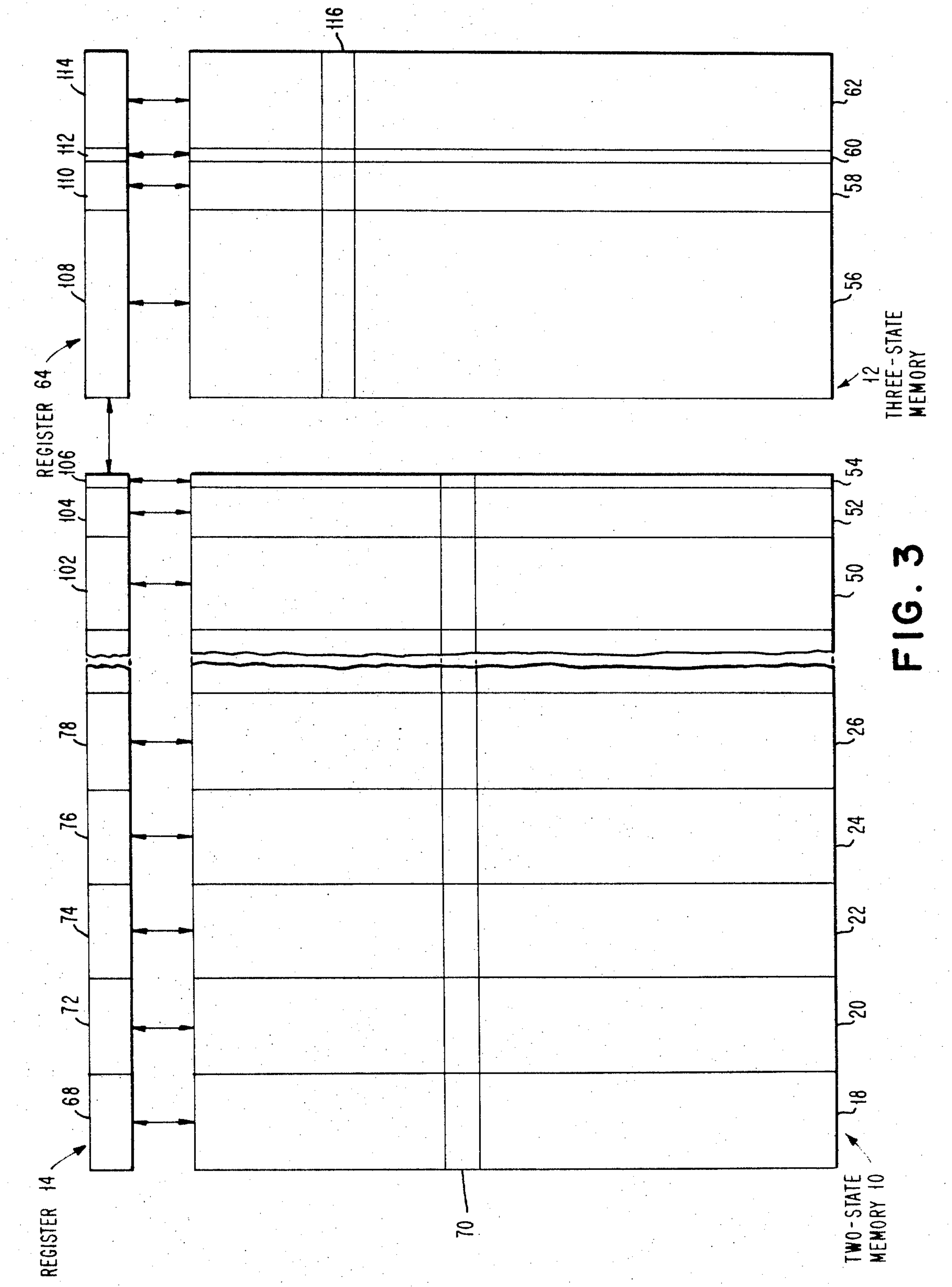
FIG. 3 is a schematic block diagram of an embodiment of a code processor according to the principles of the present invention.

In the coding of data, for example in binary and ternary notations and the like, code words are represented by a series of bits. In fixed-length codes, each character or word is represented by the same number of bits. For example, 256 different words can be coded into 256 different 8-bit binary bytes. It has long been recognized that when certain words in a data set occur more frequently than others, a variable-length code can be used wherein the more frequently occurring words are assigned longer code words. The Morse Code and the Huffman Code are examples of variable-length codes.

A dependent code is one wherein the probability of a word or character occurring is dependent on the identity of a previous character. For example, in the English language, there is a high probability that a U will follow a Q and a low probability that an S will follow Q. Thus, knowing the characteristics of a data set, a variable-length dependent code table can be created such that the code characters are assigned to a number of different code groups and coding sets. When a previous character is encoded, the coding is selected such that the most probable succeeding character will be encoded with a small number of bits. Of course, there will be times when a previous character is actually followed by an improbable character, and such character will be encoded with a longer bit word. On the average, however, a variable-length dependent code will have shorter code words and provide compaction.

The present invention relates to a processor for coding and encoding a variable-length dependent code presuming the pre-existence of the code assignment table. The manner in which the code assignment table is formed is not part of the present invention and will be described only briefly. First, the probability of each of the characters of the data set following each of the other characters is determined. For example, P1/1, P2/1, P3/1, P4/1 . . . P$n$/1 are the probabilities of each of the n characters following the first character of the data. This is repeated for P1/2, P2/2, P3/2, P4/2 . . . P$n$/2 through P1/$m$, P2/$m$, P3/$m$, P4/$m$ . . . P$n$/$m$. The $m$ lines of probabilities are then clustered into groups, similar lines being assigned to the same group. Finally, the groups are arranged in several coding sets.

A complete description of the manner in which data is arranged in code groups and coding sets is provided in copending U.S. Pat. applications, Ser. No. 85,575 and Ser. No. 119,275.

Referring to FIG. 1, a table is shown wherein a data set has been investigated and arranged according to the probabilities of given characters following preceding characters. There are only 12 characters, A through L, in the data set of the example. These are set forth in column I. The characters are assigned into five groups 0, 1, 2, 3 and 4. The group numbers are set forth in column VII. The two coding sets 0 and 1 are set forth in column VIII. The numbers in columns II, III, IV, V and VI are addresses which will be later explained.

FIG. 2 lists the variable length code words in column IX, the length of the code word which is useful in the actual embodiment, in column X, the coding set number in column XI and the address in column XII. Since the first character in a message has no preceding character, a code group 0 and coding set 0 is arbitrarily selected for the first character. However, if desired, the probability of each character in the data set being the first character could have been calculated and the group and coding set assignments made appropriately.

Since there are 12 different characters in the data to be coded in fixed-length binary code, the characters would be coded into words of four bits each. Presume that a message consists of the five characters B, F, D, A and L in that order. A group O and coding set O is arbitrarily selected for the first character B. The character B specifies the second row of FIG. 1. The group 0 (Column II OF FIG. 1) provides an address number 2 for B. In FIG. 2, an address of 2 and a coding set 0 specifies code word 01. Also, in FIG. 1, the occurrence of the B specifies a new group 1 and a coding set O (from the last two columns at the end of the row) for the next character.

The next character F (sixth row of FIG. 1) and the group 1 (column III) specifies address 2. In FIG. 2, the address 2 and the coding set 0 specify code word 01 for F. Also, a new group 3 and coding set 1 (FIG. 1) is specified for the next character.

The character D and group 3 provide an address 2. The address 2 and the coding set 1 provide word 011 from FIG. 2. Also, new group 0 and coding set 0 are produced (FIG. 1) for the next character. Character A and group 0 provides an address 1 in FIG. 1. The address 1 and coding set 0 provide a code word 11 for character A. Also, new group 0 and coding set 0 are specified.

The character L and group 0 (column II in FIG. 1) determine an address 11. The address 11 and the coding set 0 in FIG. 2 specify the code word 0000001. This is a long word due to the fact that in the data set, it is rare for an A to precede an L. Note that the encoded message 01, 01, 011, 11, 0000001 has a total of 16 bits whereas fixed length code would require 20 bits.

To decode the message, the table of FIG. 2 is used before the table of FIG. 1. The first word 01 is compared with the contents of column IX of FIG. 2. Note that since it is the first character, a group 0 and coding set 0 is specified. In coding set 0 of FIG. 2, the 01 word compares and specifies address 2. The group 0 specifies column II in FIG. 1 wherein the address 2 specifies character B and also establishes new group 1 and coding set 0. The next character 01 and new coding set 0 are applied to FIG. 2 and specify address 2. In FIG. 1, the group 1 (column III) and address 2 specify character F and new group 3 and coding set 1. Note that, although the B and F were both encoded as 01, they were decoded properly.

The next word 011 and new coding set 1 specify address 2 in FIG. 2. The group 3 (column V) and address 2 specify character D in FIG. 1 and specify new group 0 and coding set 0.

Word 11 and new code set 0 determine address 1 in FIG. 1. Group 0 (column II) and address 1 specify character A in FIG. 1 and establish new group 0 and coding set 0. In like manner, the next character 0000001 and the new coding set specify address 11 in FIG. 2. Group 0 and address 11 specify the character L in FIG. 1.

The tables of FIG. 1 and FIG. 2 are representative of associative memory storage units and their contents, which are employed in the processor of the present invention. It is to be noted that the variable length code set forth in FIG. 2 satisfies the prefix-free condition. That is, no code word is found at the beginning of any other code word in each coding set. Thus, in coding set 0, the character 01 is not found in the first two bits of any other word.

Referring to FIG. 3, a schematic block diagram and an associative register processor is shown. The processor is designed in this embodiment to encode 8-bit bytes into a variable code having code words up to a maximum of 16 bits. There are 256 possible 8-bit code words in the code. Memory unit 10 corresponds to the table of FIG. 1 and memory unit 12 corresponds to the table of FIG. 2. Unit 12 is a three-state memory, that is, the bit positions may store a "1" bit, a "0" bit or a third state referred to as "don't care." Memory unit 12 may be similar to the three-state memory described in corresponding U.S. Pat application Ser. No. 52,306 entitled, "Data Compaction Using Variable-Length Coding" to J. Raviv et al., filed Aug. 10, 1970 and assigned to the present assignee and memory unit 10 may be similar to the two-state associative memory described in U.S. Pat. No. 3,317,898 entitled "Memory System," issued May 2, 1967 to H. Hellerman and assigned to the present assignee.

Memory unit 10 is functionally divided into 256 rows and 19 columns. The first 17 columns (columns 18 through 50) are 8 bits wide, the 18 column (column 52) is 4 bits wide, and the 19 column (column 54) is 1 bit wide. Register 14 is provided having the same bit size segments as unit 10. In unit 10, column 18 has stored therein the 256 possible code words, each 8 bits in length. Columns 20, 22, 24 . . . 50 are associated with the 16 groups and contain the 8-bit address words in the same manner as described for columns II through VI in FIG. 10. It is presumed that the data set for the embodiment of FIG. 3 has been allocated into 16 groups and two coding sets by using the probability calculations previously described. Column 52 contains 4-bit words, which are the corresponding group numbers for the words in column 18 and determine the appropriate selection of columns 20 through 50 associated with the groups 0 through 15. Column 54 contains the 1-bit designations for the 0 or 1 coding sets.

Memory unit 12 is functionally divided into four columns. Column 56 is 16 bits wide and 512 rows long and contains the variable length code words. The remaining bit positions for code words less than 16 bits are occupied by "don't care" indications or states. Column 58 contains 4-bit words indicating the length of the adjacent code word (in column 56) where 0000 indicates length of 16, column 60 is 1 bit wide and contains the coding set indication bits, and column 62 is 8 bits wide and contains the addresses. Memory 12, therefore, is arranged in the same manner as the table of FIG. 2. Register 64 is provided and has the bit size segments as memory 12.

The encoding operation of an 8-bit fixed-length code to the variable length code will next be described. The operation is functionally the same as was described relative to FIGS. 1 and 2. Again, the group and coding set for the first word of the data is arbitrarily chosen as 0, 0. Thus, the address will be selected from column 20.

Register 14, into which the addresses from columns 20–50 are read, is conditioned so that only portion 72 will accept an address. This means that only an address read out of column 20 (related to group 0) will be accepted. Also, a "0" bit (for coding set 0) is entered into portion 112 of register 64.

The first data word is entered into the 8-bit section 68 of register 14 and an association is made wherein the word is simultaneously compared with all the words in column 18, and one match will occur, for example with the word in row 70. The 16 addresses of row 70 are read, but only the address in column 20 is read into portion 72 of register 14. Also, the group number and coding set number of row 70 are read into portions 104 and 106 of register 14.

The 8-bit address in portion 72 of register 14 is transferred to portion 114 of register 64. The 8-bit address now in portion 114 and the coding set number indication bit in portion 112 of register 64 are compared with the 9 bits in each of the rows of columns 60 and 62 of memory 12. A match will occur on one of the rows, for example, row 116; and the variable length code word in row 116 is read out of column 56 into portion 108 of register 64. The length of the word is read from column 58 into portion 110 of register 64. Presuming the word is length five, it will consist of 5 binary bits and 11 "-don't care" states. The length indication in portion 110 of register 64 causes only the meaningful 5 bits in portion 64 to be shifted out as an encoded word.

The group number stored in portion 104 of register 14 for the first input word is employed to select the next one of portions 72 through 102 which will accept an address for the next 8-bit input code word, thereby determining the groups for the next input code word. The coding set number indication bit stored in portion 106 of register 14 is transferred into portion 112 of register 64 as the coding set number for the next input code word. Thus, the group and coding set number read on line 70, columns 52 and 54 of memory 10 for the first input word is employed as the group and coding set number for the next input word. The aforesaid operation is repeated for all the other input words to be encoded.

Memories 10 and 12 with registers 14 and 64 are also used for decoding. As in the encoding mode, the first variable length word to be decoded operates with a group 0 and coding set 0. Register 14 is arranged such that the address will be entered only from portion 72 into column 20 (for group 0) and the coding set 0 is entered into portion 112 of register 64. The first 16 bits of coded data to be decoded is entered into portion 108 of register 64. Most likely, the code word may be less than 16 bits and the remaining positions of portion 108 are occupied by succeeding data bits. The code word in portion 108 and the coding set number in portion 112 are compared with the words and coding set number in columns 56 and 60 of memory 12. A match will occur on only one row because no word in a coding set forms the beginning of any other word. When a word is matched, for example, the word in row 116, its corresponding address from column 62 and the length information in column 58 is read out and stored in portions 114 and 110, respectively of register 64.

The address word in portion 114 is transferred to register 14 and is compared with the words in column 20 of memory 10. A single match will occur, for example, on line 70, and the corresponding eight bit code word in column 18 is read into portion 68 of register 14 as the decoded output word. The group number and coding set number of the matched word row is read out of columns 52 and 54. The group number is used to determine which of the columns 20 through 50 will receive the next address produced by the next word, and the coding set indication bit is stored in portion 112 of register 64 to be used for the next word to be decoded. The length information in portion 110 of register 64 is used to increment portion 108 to remove the word just encoded and to enter an equal number of new data bits into portion 108. Each succeeding variable-length code word is then decoded in the same manner.

Figures 4, 4A:
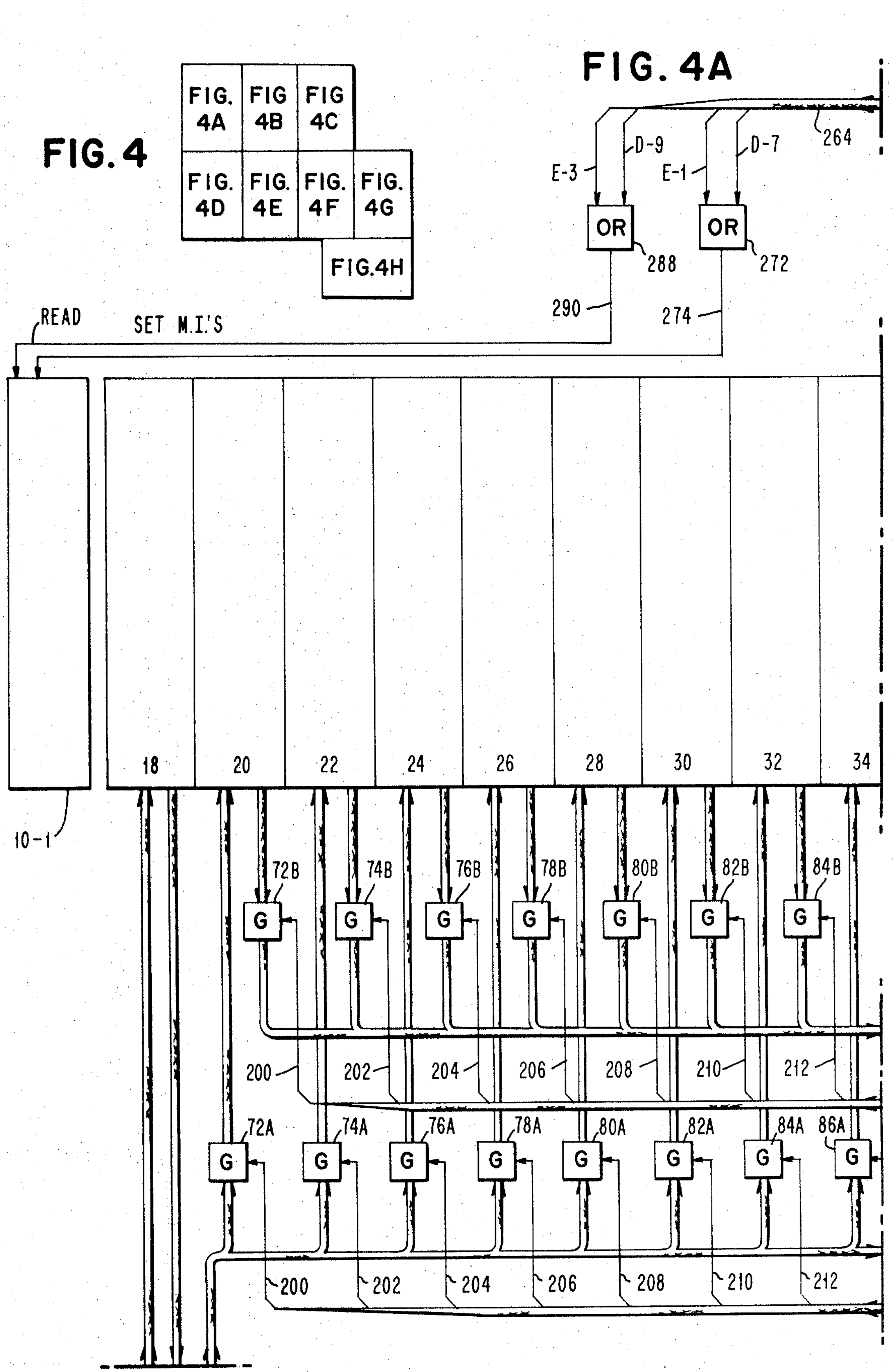
FIGS. 4A through 4H arranged as shown in FIG. 4 provide a schematic circuit diagram for the code processor of FIG. 3.
Figure 4B:
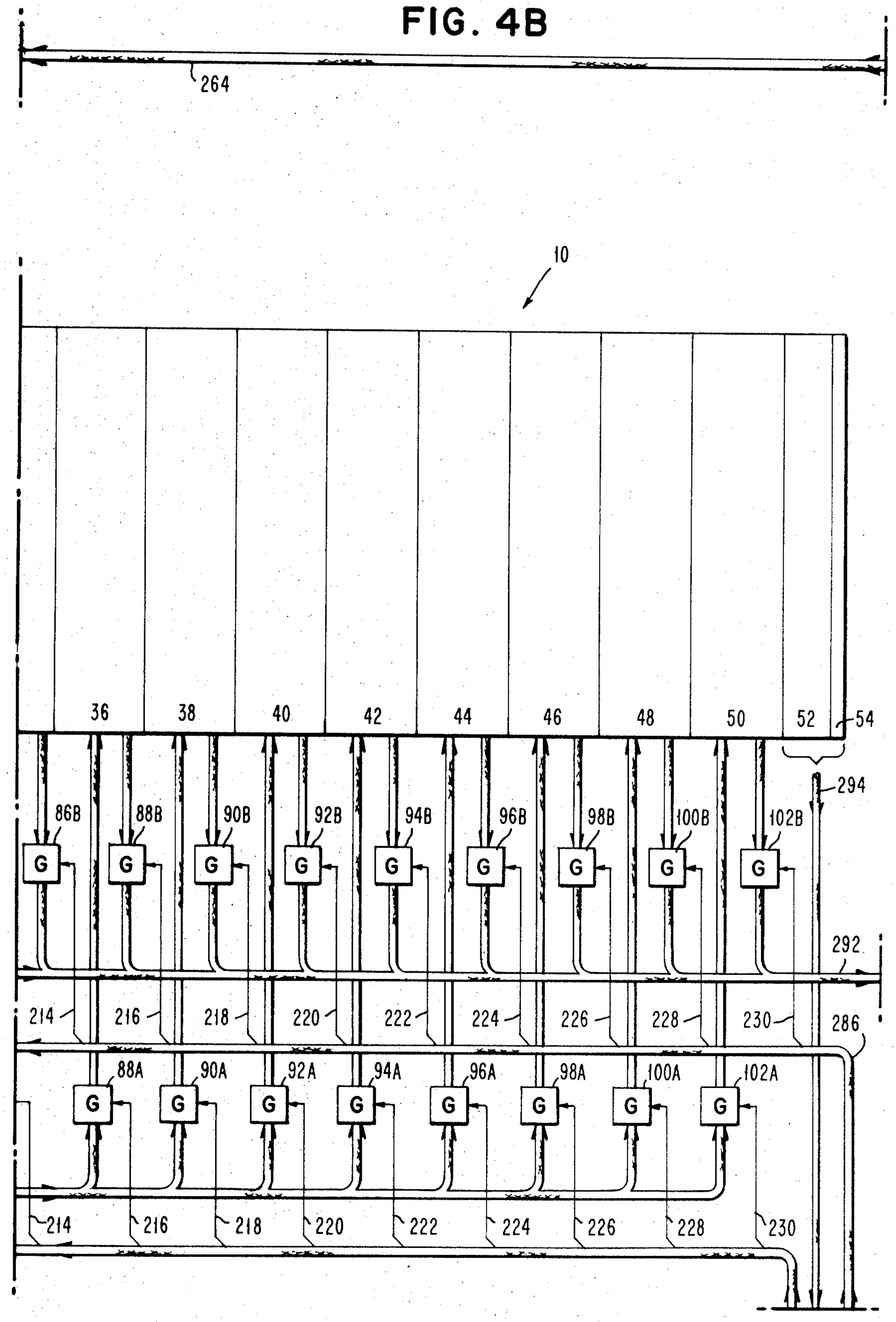

Referring to FIGS. 4A–4H assembled as shown in FIG. 4, a more detailed embodiment of FIG. 3 is illustrated. Whenever possible, the reference numbers used in FIG. 3 are used in FIGS. 4A–4H to identify identical elements. The sequence of encoding and decoding will be described and a detailed description of the system will be provided.

ENCODING SEQUENCE

Figure 4C:
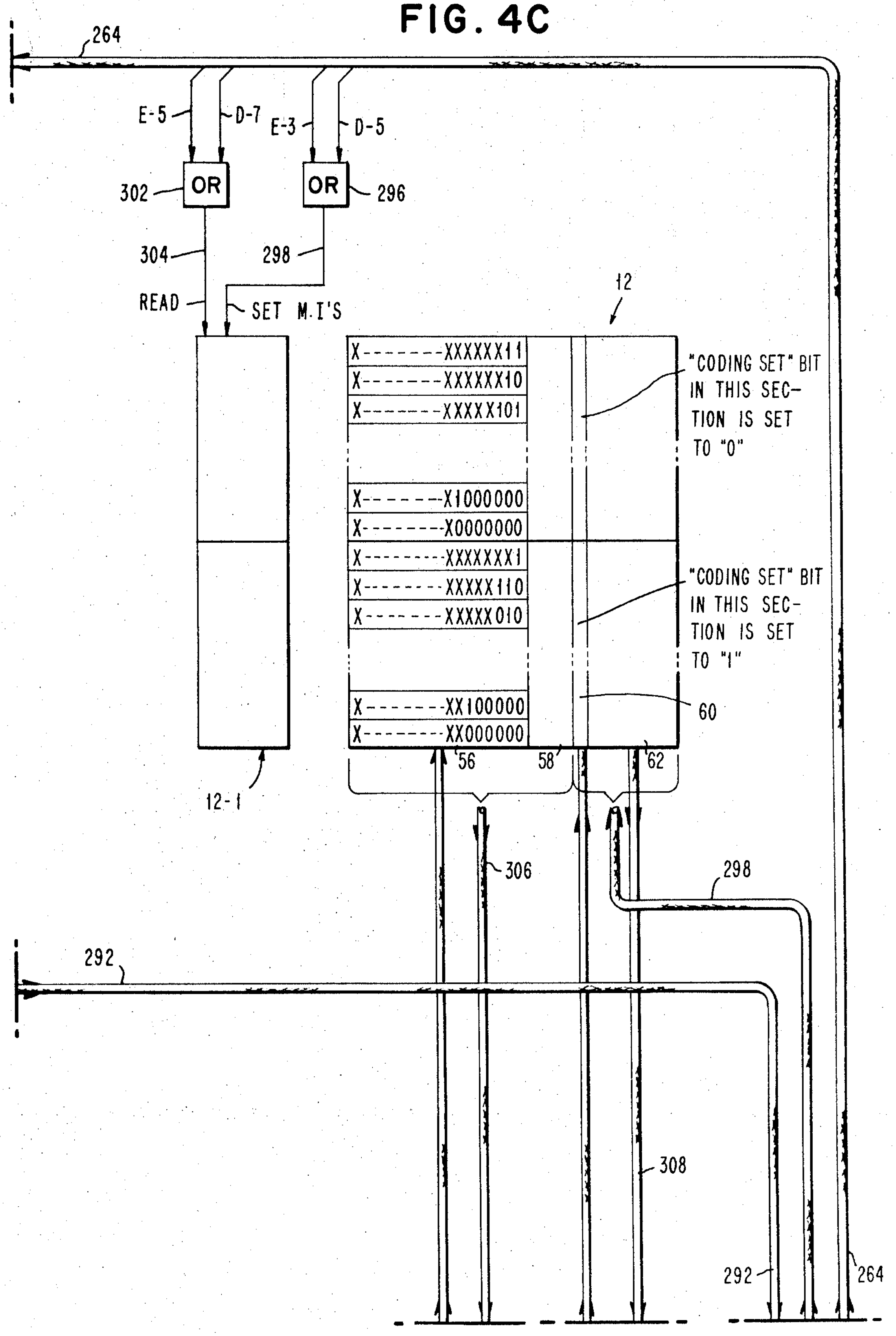

The fixed-length input words are entered into the system from an input device such as a computer or a transmission line. A word counter 254 in FIG. 4F is provided which is set to the number of words to be encoded. As each input word is encoded, the word counter will decrement and the system will continue to operate until the count reaches zero. At this time, the operation will end. The encoding sequence is determined by encoding clock pulses designated E–1 through E–9. The encoding sequence will first be described by indicating what takes place upon the occurrence of each clock pulse. Initially, the word counter 254 is set to the number of words to be encoded. A group number of 0 is established by setting register 104–2 (FIG. 4E) to 0000. The coding set of 0 is established by setting register portion 112 in FIG. 4G to 0.

AT E–1

Register 68–1 (FIG. 4D), the argument register for associative memory 10, is gated. The match indicator flip-flops in control section 10–1 (FIG. 4A) of associative memory 10 is set to "1."

AT E–2

The contents of argument register 68–1 are associated on column 18 of associative memory 10. The 8-bit address word of the matching word from one of the columns 20–50 inclusive of associative memory 10 is read out to the argument register 114 (FIG. 4G) for associative memory 12 (FIG. 4C). The column of associative memory 10 to be read out will be determined by the group number in register 104–2. Initially, this is 0000. From the same matching word in associative memory 10, the group number from column 52 is read out to the register 104–1 and the coding set number from column 54 to register 106 (FIG. 4E). The match indicator flip-flops in associative memory 12 are set to "1." The read out of associative memory 10 is non-destructive.

AT E–4

Using argument register portions 112 and 114 (FIG. 4G), associate the coding set number word and the address word on column 60 and 62 of associative memory 12 to obtain a match.

AT E–5

In associative memory 12, read the portion of the matching word in column 56 into register portion 108–2 (FIG. 4F). Also, in associative memory 12, read the time length of the code assignment for the matching word in column 58 to register portion 110 (FIG. 4G). Decrement word counter 254.

AT E–6

Gate out the rightmost bit of register portion 108–2.

AT E–7

Shift register portion 108–2 and decrement the length counter which is register portion 110.

AT E–8

Test register portion 110 to determine if the length counter equals zero. If the length counter is not at zero, repeat steps E–6, E–7 and E–8 until the length counter is at zero. At this point, interrogate the word counter to determine if it is equal to zero indicating that no further words are to be encoded. If the word counter 254 is at zero, the system ends its operation. If word counter 254 is not equal to zero, generate clock pulse E–9.

AT E–9

Gate the group number from register 104–1 to register 104–2 and gate the coding set number from register portion 106 to register portion 112. Generate clock pulse E–1 and repeat the entire cycle of operation until the word counter 254 is equal to zero.

Figure 4D:
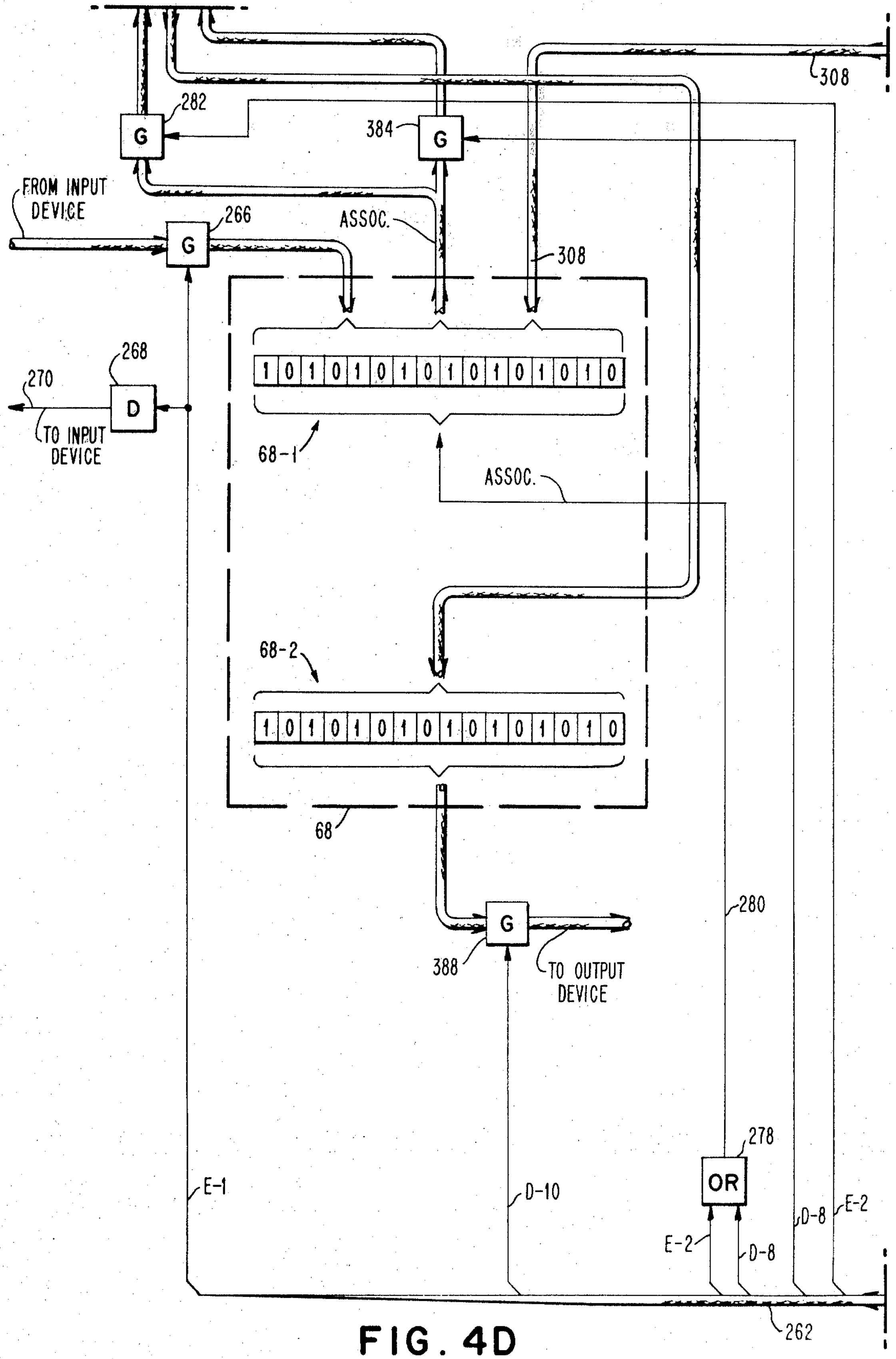
Figure 4E:
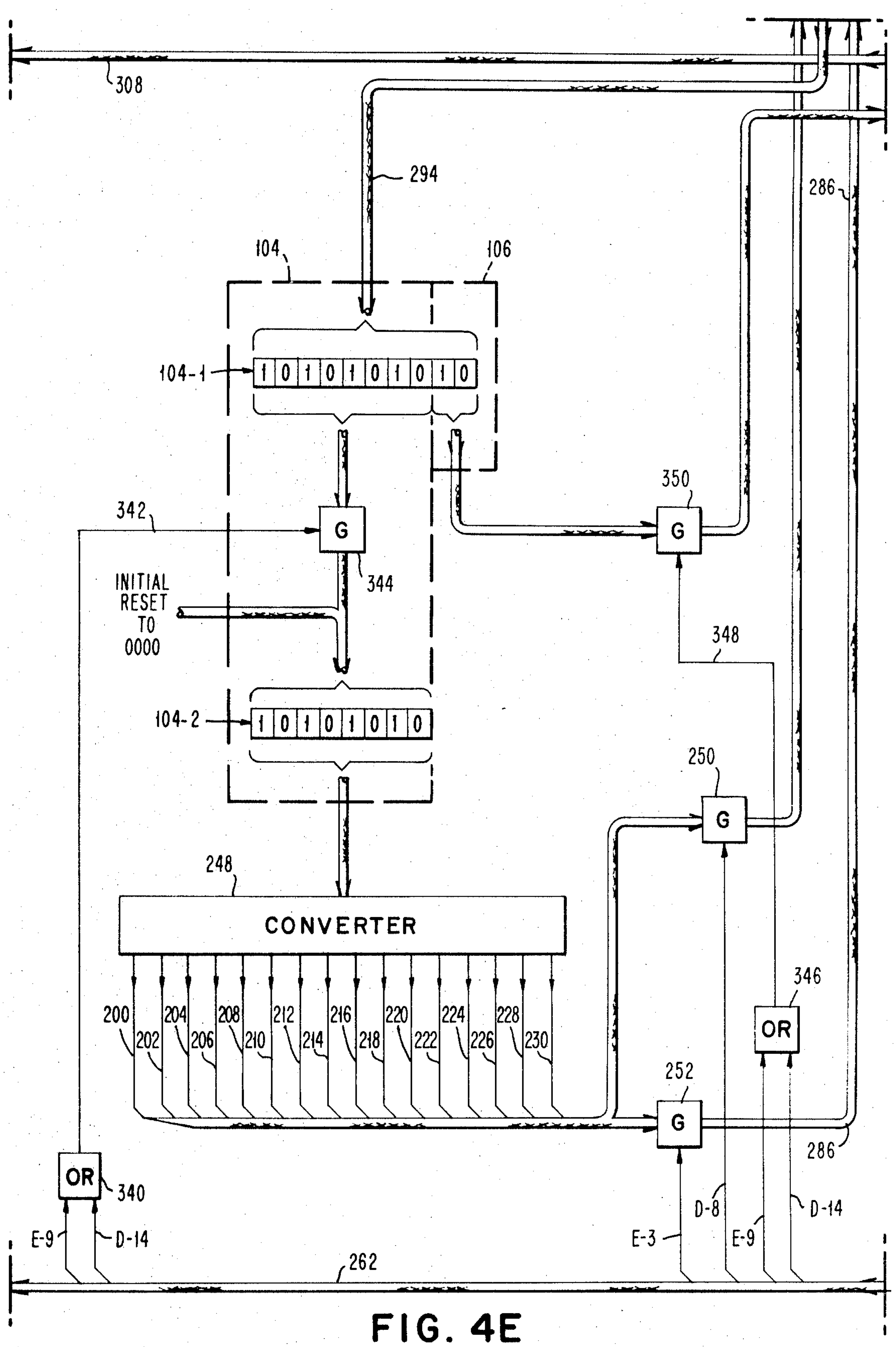
Figure 4F:
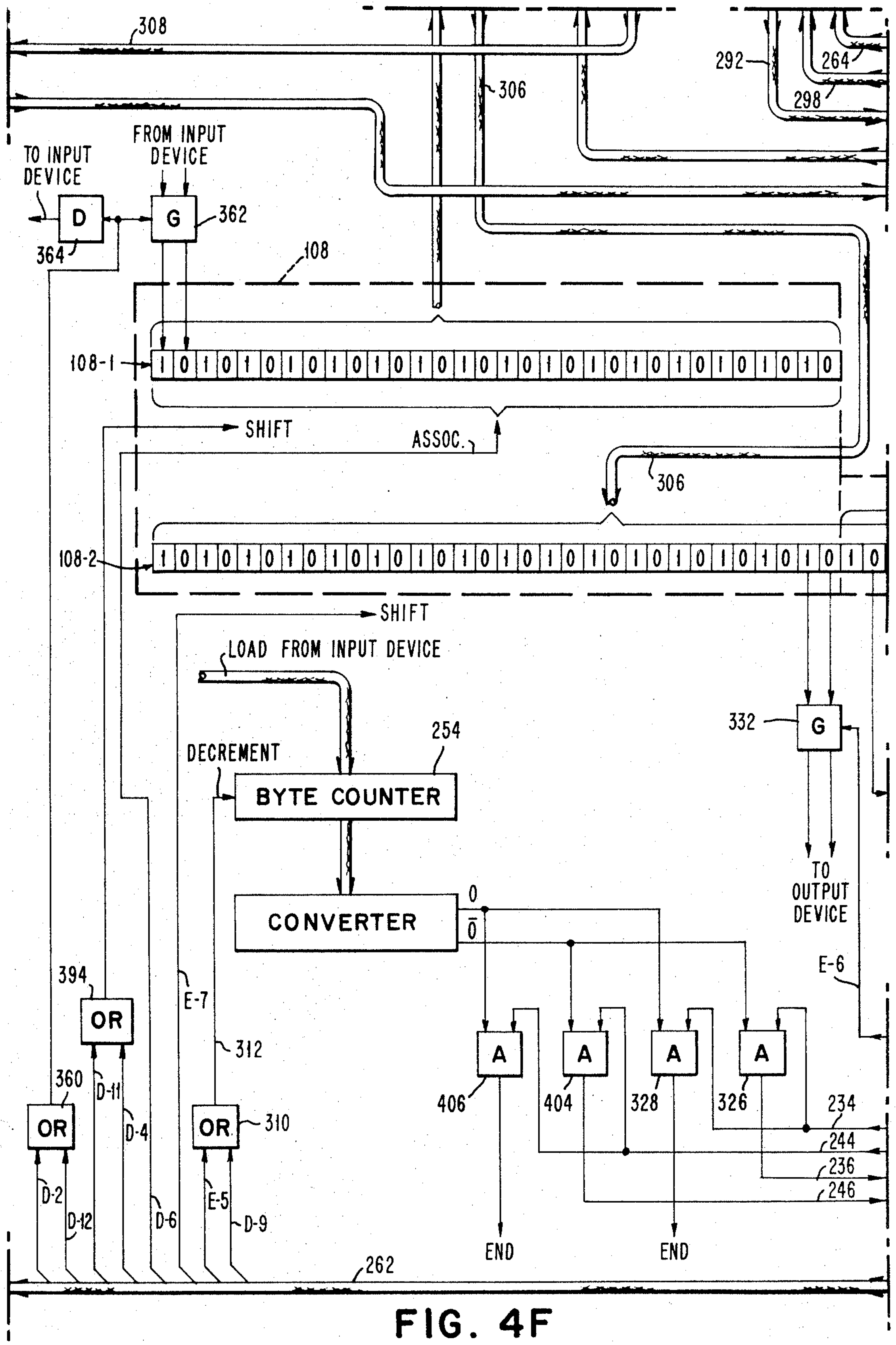
Figure 4G:
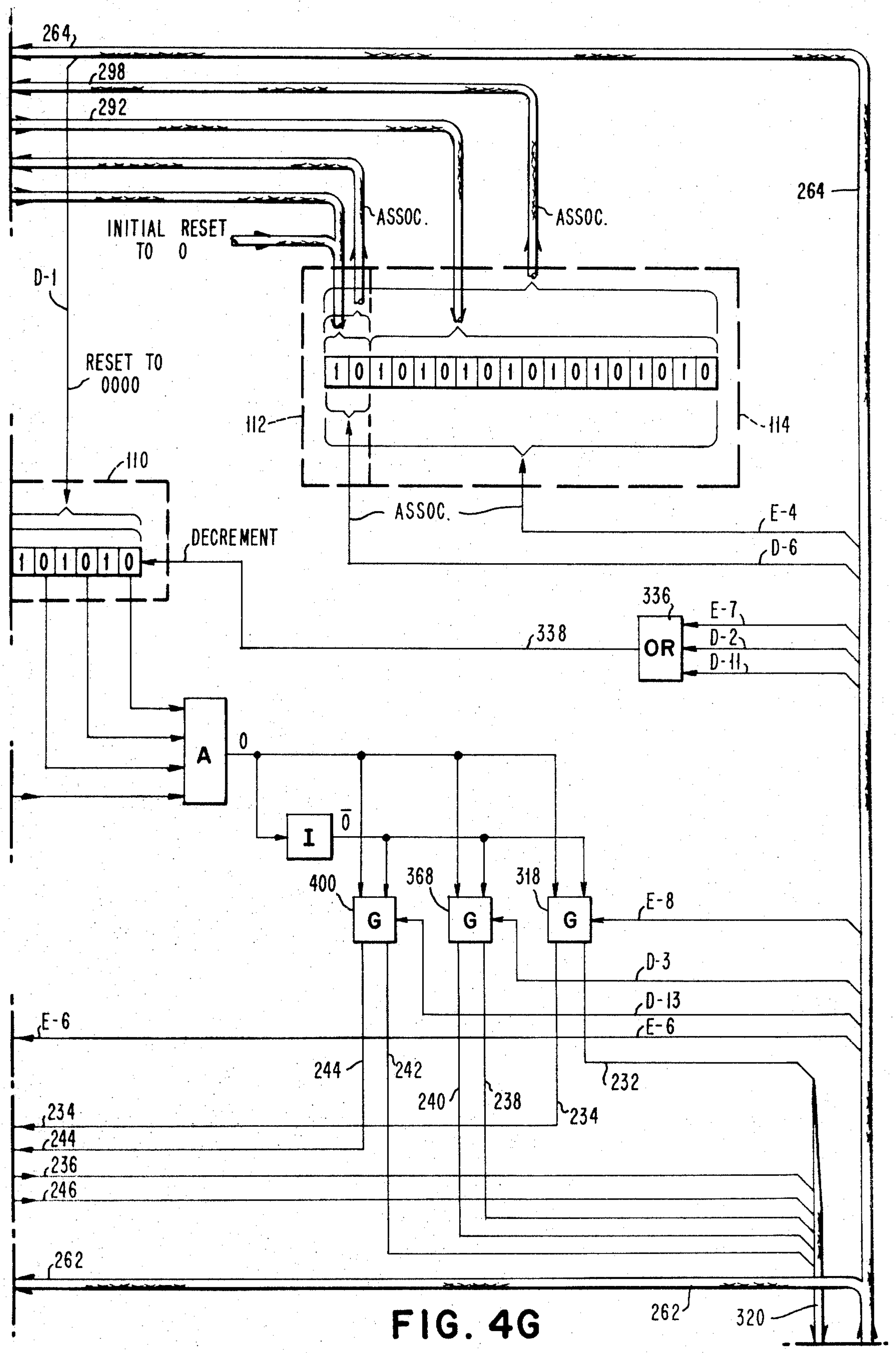

Prior to a detailed description, the relationship between the elements of FIG. 3 and those shown in FIGS. 4A–4H should be noted. In FIG. 3, register 14 consists of portions 68, 72, 74, 76, 78 and up through 106. In FIG. 4D, register portion 68 consists of two registers—68–1 and 68–2. Register portions 72 to 106 in FIG. 3 actually are pairs of gates designated 72A and 72B through 102A and 102B in FIGS. 4A and 4B. Register 64 is shown consisting of portions 108, 110, 112 and 114 in FIG. 3 register portion 108 in FIG. 4F consists of 2 register 108–1 and a register 108–2. Register portions 112 and 114 are shown in FIG. 4G. Register portion 104 of register 14 of FIG. 3 is shown in FIG. 4E consisting of registers 104–1 and 104–2. Register portion 106 is located at the right side of register portion 104–1 in FIG. 4C.

ENCODING OPERATION

In the encoding operation, register portions 104–2 (FIG. 4E) relating to the group number is first reset to 0000. Register portion 112 in FIG. 4G relating to the coding set is also reset to 0. word counter 254 in FIG. 4F is set to the number of words to be encoded. A pulse is then applied on input lead 256 of the encoder clock in FIG. 4H. The pulse on lead 256 extends through the OR circuit 258 to turn on the single-shot 260. This produces a E–1 pulse on the E–1 lead which extends through the cable 262 to FIG. 4D and is applied to gate 266 in order to gate in the first input code word from the input device to register portion 68–1. The E–1 pulse is also applied through the delay circuit 268 to lead 270 which extends to the input device and functions as a signal to the input device that the next code word can be put on the input cable to gate 266.

When single-shot 260 of the encoding clock (FIG. 4H) goes off, it turns on single-shot 276 producing the E–2 pulse on lead E–2 which extends through cable 262 to OR circuit 278 in FIG. 4D which provides a signal on lead 280. The signal on lead 280 is applied to the register portion 68–1 as an association pulse. The E–2 pulse is also applied to gate 282 in FIG. 4D to gate the output of register portion of 68–1 to column 18 of associative memory 10 (FIG. 4A). Thus, the contents of register portion 68–1 is compared with the contents of column 18 of associative memory 10, and all the match indicators of associative memory 10 except one will be reset to their "0" state. The match indicator of associative memory 10 which is left in its "1" state as a result of the match will permit the readout of the matching word from column 18.

When single-shot 276 of the encoding clock goes off, it turns on single-shot 284, thereby producing the E–3 pulse on lead E–3 which extends through cable 262 and is applied to gate 252 in FIG. 4E to gate the output of converter 248. Since the register portion 104–2 containing the group number was initially set to a group number of 0000, a signal appears on lead 200 of converter 248. The signal on lead 200 extends through gate 252 and through cable 286 and is applied to gate 72B in FIG. 4A. The E–3 pulse also extends through cable 264 to OR circuit 288 in FIG. 4A, thereby applying a signal on lead 290 which is used to read out the contents of associative memory 10 as a result of the match between the contents of register 68–1 and a word in column 18. Since the group number 0000 produced a signal on lead 200 which activated gate 72B, the address word in column 20 in the matching row will be read out. The address word in column 20 is read out through gate 72B via cable 292 and is entered into register portion 114 in FIG. 4G. As previously mentioned, register portion 114 is one of the argument registers for associative memory 12. The 4-bit group number from the matching row in column 52 of associative memory 10 and the 1-bit coding set number in the matching row of column 54 of associative memory 10 are read out via cable 294 to register portion 104–1 and 106 in FIG. 4E. The E–3 pulse also extends through cable 264 and is applied through OR circuit 296 (FIG. 4C) which produces a signal on lead 298. The signal on lead 298 sets the match indicator flip-flops in the control section 12–1 in associative memory 12 to their "1" states.

Figure 4H:
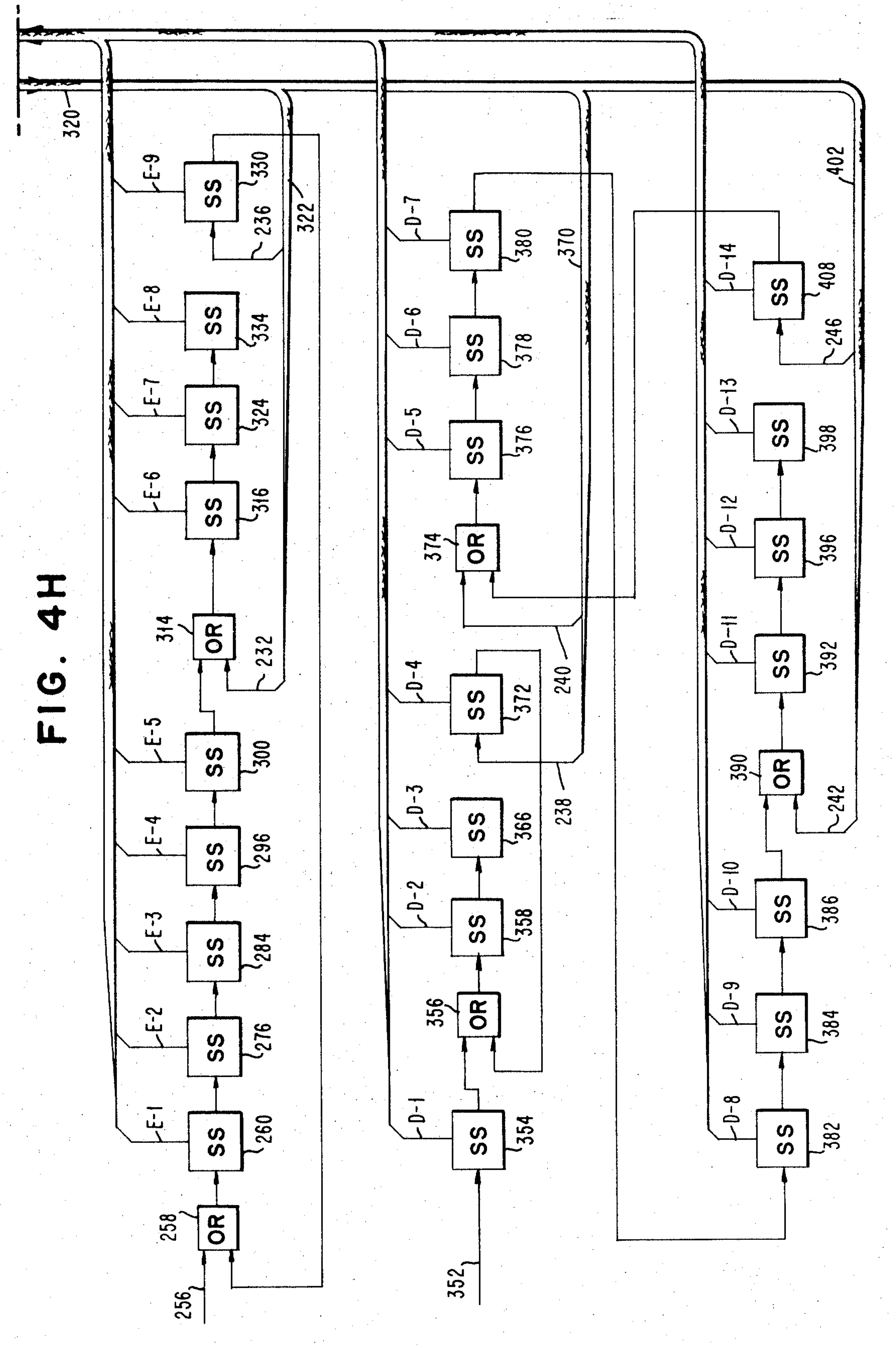

When single-shot 284 of the encoding clock in FIG. 4H goes off, it turns on single-shot 296 thereby producing the E–4 pulse which extends through cable 264 and is applied as the association pulse to register portions 112 and 114 in FIG. 4G. The contents of register portions 112 and 114 extend via cable 298 to columns 60 and 62 of associative memory 12. A match will occur in one row of columns 60 and 62 and all match indicator flip-flops except the one associated with the match will be reset to their "0" states.

When single-shot 296 of the encoding clock goes off, single-shot 300 is turned on thereby producing the E–5 pulse which extends through cable 264 and is applied to OR circuit 302 in FIG. 4C. This produces a signal on lead 304 which is used to read the code word and its length from the matching row of columns 56 and 58, respectively of associative memory 12. The code word and length read out from columns 56 and 58 of associative memory 12 are conveyed through cable 306 into register portions 108–2 and 110. The code word is entered into register portion 108–2 and its length is entered into register portion 110. The matching address word from column 62 of associative memory 12 is conveyed via cable 308 and is entered into argument register 68–1 of FIG. 4D.

What has occurred thus far is that an input fixed-length code word has been compared with the contents of column 18 of argument register 10. Since the initial group number was 0000, the matching address in column 20 was read out and entered into register portion 112. Also, the group number from the matching row of associative memory 10 was read out of column 52 and entered into register portion 104–1. Also, the coding set number from the matching row of associative memory 10 was read out of column 54 and entered into memory portion 106. Then the address word which was entered into register portion 114 was compared with the contents of column 62 of associative memory 12 along with the initial coding set number 0 from register portion 112 which was compared with the contents of column 60 to produce a match. A match will occur on one of the rows therein. The variable-length code word from the matching row of column 56 of associative memory 12 and its length from column 58 were entered into register portions 108–1 and 110 of FIGS. 4F and 4G.

The E–5 pulse from single-shot 300 of encoding clock also extends via lead 262 and is applied through OR circuit 310 (FIG. 4F) to lead 312. The signal on lead 312 is used to decrement the word counter 254 to indicate that an input word has been encoded into a corresponding variable-length code word from column 56 of associative memory 12. When single-shot 300 of the encoding clock goes off, a pulse extends through OR circuit 314 to turn on single-shot 316, thereby producing an E–6 pulse which extends via cable 264 and is applied to gate 332 (FIG. 4F) to gate the rightmost bit of the variable-length code word in register portion 108–2. This bit is the first bit of the variable-length code word and is transferred through gate 332 to the output device, for example, the transmission line computer or the like.

When single-shot 316 of the encoding clock goes off, single-shot 324 is turned on thereby producing the E–7 pulse which extends via cable 262 to register portion 108–2 and shift the register portion 108–2 one bit position to the right. The E–7 pulse also extends through OR circuit 336 of FIG. 4G to lead 338 to decrement register portion 110 by one. This reduces the length indication word in register 10 by 1.

When single-shot 324 goes off, single-shot 334 turns on producing the E–8 pulse which extends through cable 264 where it is supplied to gate 318 in FIG. 4G in order to test register portion 110. If register portion 110 is not at zero, a pulse will be produced on lead 232. Lead 232 extends via cables 320 and 322 through OR circuit 314 in FIG. 4H and turns on single-shot 316. Thus, the E–6 pulse is again produced which will shift out the next bit of the variable-length code word in register portion 108–2 and the E–7 pulse will be produced to decrement the length indication in register portion 110 by 1 and the E–8 pulse will be produced to test to see if the contents of register portion 110 is at zero. This operation will repeat until the entire variable-length code word is shifted out of register portion 108–2 and the contents of register portion 110 will be zero. When the contents of register portion 110 is zero, the E–8 pulse applied to gate 318 (FIG. 4G) will cause a signal to be transmitted on lead 234 rather than 232. The signal on lead 234 extends to AND circuits 326 and 328 in FIG. 4F. In this manner, the word counter 254 is tested to see if it is at zero indicating all the input words have been encoded. If word counter 254 is at zero AND circuit 328 will be gated and produce an output signal indicating the end of encoding operation. If the word counter 254 is not at zero, AND circuit 326 will be gated and produce an output on lead 236 which is applied via cables 320 and 322 to turn on single-shot 330 (FIG. 4H) of the encoding clock.

When single-shot 330 is turned on, it produces an E–9 pulse which extends via cable 262 through OR circuit 340 of FIG. 4E to produce an output signal on lead 342. The output lead on 342 enables gate 344 and group number in register portion 104–1 is thereby transferred to register portion 104–2 in order to control the converter 248 so that the output lead from decoder 248 corresponding to the group number will be energized. The E–9 pulse is also applied through OR circuit 346 (FIG. 4E) to lead 348 which extends to gate 350 on FIG. 4E in order to transfer the new coding set number stored in register 106 to register portion 112 of FIG. 4G. Thus, the group number obtained from column 52 of associative memory 10 is now stored in register portion 104–2 in order to determine which of the columns 20–50 of the associative memory will be read out in the next operation. Likewise, the coding set number obtained during the encode operation from column 54 of associative memory 10 has been transferred to register portion 112 for comparison with column 60 of associative memory 12 in the next encode operation. When single-shot 330 goes off, a pulse extends back through OR circuit 258 of the encoding clock to repeat the operation for the next input word which must be encoded.

DECODING SEQUENCE

The decoding mode is controlled by a sequence of decoding clock pulses D–1 – D–14. Prior to D–1, the word counter 254 is set to the number or words to be decoded. A group number of 0000 is set in register 104–2 (FIG. 4E) and a coding set of 0 is entered into register 112 (FIG. 4G).

AT D–1

The length indication in register 110 is set to 0000.

AT D–2

The first bit of the variable-length word to be decoded is gated from the input device to the leftmost bit position of register portion 108–1 and the length indication in register portion 110 is decremented by 1.

AT D–3

Test register portion 110 to see if the length is zero. If the length is not zero at D–4, shift register portion 108–1 and again generate pulses D–2 and D–3. At D–3, if the length word in register portion 110 is zero, it means that 16 bits of data have been shifted into register portion 108–1 and an association can be made. Therefore, D–5 is generated.

AT D–5

The match indicator flip-flops in section 12–1 (FIG. 4C) of associative memory 12 are set to "1."

AT D–6

The 16 bits in register portion 108–1 and the coding set number indication bit in register portion 112 are compared respectively with column 56 and 60 of associative memory 12 and a match will occur on one of the rows therein.

AT D–7

The eight-bit address in column 62 on the matching row of associative memory 12 is transferred to the argument register portion 68–1 of associative memory 10. The word in the matching row of column 56 of the memory 12 is transferred to register portion 108–2 and the length word in the matching row of column 58 is transferred to register portion 110, and the match indicator flip-flops and associative memory 10 are set to "1."

AT D–8

The bit address word in register portion 68–1 is compared with the contents of one of the elements 20–50 of associative memory 10. The particular column from which the address word is compared will be determined by the group number in register portion 104–2 which is initially set to 0000.

AT D–9

The code word in the matching row of column 18 is transferred to register portion 68–2. From the matching row, the group number from column 52 is transferred to register 104–1 and the code set from column 54 is transferred to register 106. The word counter is decremented by 1.

AT D–10

The decoded word in register 68–2 is gated to the output device.

AT D–11

Argument register 108–1 is shifted one bit and the length in register portion 110 is decremented by 1.

AT D–12

A new data bit is entered into the leftmost bit of argument register portion 108–1.

AT D–13

The length in register portion 110 is tested. If it is not at zero, pulses D–11 and D–12 are repeated until the length word in register portion 110 is zero. At this point, if the word counter 254 is zero, the operation ends. If it is not zero, pulse D–14 occurs.

AT D–14

The group number from register portion 104–1 is gated to register portion 104–2 and the code set from register 106 is gated to register 112. The sequence of operations from D–5 on is repeated until the contents of the word counter 254 indicating all words have been decoded. It is to be understood that the readout of associative memory 10 and associative memory 12 is nondestructive and that the contents remain in the memory during all of the decoding operations.

DECODE OPERATION

Initially, word counter 254 in FIG. 4F is set in accordance with the number of words to be decoded. A group number of 0000 is set in register portion 104–2 in FIG. 4E. A coding set number is established by setting register portion 112 of FIG. 4G to zero. A start pulse is then applied to lead 352 of FIG. 4H to initiate the decode clock. The start pulse on lead 352 turns on single-shot 354 to produce a D–1 pulse which extends via cable 264 to register 110 (FIG. 4G) to reset the word length indication to 0000.

When single-shot 354 goes off, a pulse is transmitted through OR circuit 356 and turns on single-shot 358 to produce a D–2 pulse which is transmitted through cable 262 and through OR circuit 360 of FIG. 4F and is applied to gate 362 in order to gate in the first bit of the word to be decoded from the input device. This same pulse is transmitted to delay circuit 364 to provide a signal to the input device indicating that the next bit can be sent in on the input wires to gate 362. The D–2 pulse is also transmitted through cable 264, OR circuit 336 and lead 338 in order to decrement by one the contents of register portion 110 in FIG. 4G.

When single-shot 358 goes off, single-shot 366 is turned on and produces the D–3 pulse which is transmitted via cable 264 to gate 368 (FIG. 4G) in order to test register portion 110. If register portion 110 is at zero, a pulse will appear on lead 240 which is transmitted through cable 320 and cable 370 to OR circuit 374 (FIG. 4H), the output of which turns on single-shot 376 to produce a D–5 pulse. However, if the contents of register portion 110 is not zero indicating that register 108–1 is not completely filled, a pulse will appear on lead 238 which is transmitted through cable 320 and cable 370 to turn on single-shot 372 to produce a D–4 pulse.

The D–4 pulse is transmitted via cable 262 and OR circuit 394 (FIG. 4F) to shift register 108–1 by 1 bit. When single-shot 372 turns off, a signal is applied through OR circuit 356 to single-shot 358 to produce another D–2 pulse. The aforesaid operation continues until register portion 108–1 is filled as indicated by the fact that register portion 110 will be zero. As previously mentioned, at this time single-shot 376 is turned on and the D–5 pulse is produced which is transmitted via cable 264, OR circuit 296, and lead 298 (FIG. 4C) to set the match indicator flip-flops of associative memory 12 to their code "1" states.

When single-shot 376 turns off, single-shot 378 turns on producing the D–6 pulse which is transmitted via cable 262 to cause the association of the contents of register 108–1 with the contents of column 56 of memory 12. The D–6 pulse is also transmitted through cable 264 to register portion 112 in order to associate the coding set number indication bit with the contents in column 60 of memory 12. Thus, the address word in column 62 of the matching row of memory 12 is read out and transmitted to cable 308 to argument register portion 68–1 of FIG. 4D. The matching word in column 56 and its length indicating word in column 58 are also read out through cable 306 to register portions 108–1 and register 110, respectively. The D–7 pulse is also transmitted through cable 264, OR circuit 272 and lead 274 (FIG. 4A) in order to set the match indicator flip-flops of associative memory 10 to their code "1" states.

When single-shot 380 goes off, single-shot 382 is turned on, thereby producing the D–8 pulse which is transmitted through cable 262, OR circuit 278 AND lead 280 and functions as the association pulse for argument register portion 68–1 in FIG. 4D. The D–8 pulse is also connected to gate 250 to gate the output of decoder 248 to one of the gates 72A through 102A in FIGS. 4A and 4B. As previously stated, register portion 104–2 was originally set with a code group of 0000. Therefore, the output signal from converter 248 will appear on lead 200 and be connected to gate 72A associated with column 20 of associative memory 10. The D–8 pulse is also applied to gate 384 (FIG. 4D) in order to gate the contents of argument register portion 68–1 to gates 72A to 102A. However, only gate 72A is enabled and therefore the contents of register 68–1 is compared with the contents of column 20 of memory 10 and a match will occur on one of the rows.

When single-shot 382 goes off, single-shot 384 is turned on and produces the D–9 pulse which is transmitted through cable 264, OR circuit 288, AND lead 290 (FIG. 4A) and functions as the read pulse for the associative memory 10. The eight-bit code word for the matching row is read out of column 18 of memory 10 and into register portion 68–2. The 4-bit group number from the matching row is read out of column 52 of memory 10 and stored in register portion 104–1. Likewise the coding set number of the matching row is read out from column 54 and stored in register portion 106. The D–9 pulse is also transmitted to cable 262 and OR circuit 310 to decrement the word counter 254.

To summarize the operation thus far, 16 incoming data bits were serially placed in register portion 108–1 and compared in associative memory 12 along with a code set bit of 0. A variable-length code word in column 56 was matched with a corresponding number of data bits. The address word for the matched code word was read out of memory 12. The address word from column 62 of memory 12 was entered into register 68–1 and compared with one of the columns of associative memory 10 as determined by the group number which was initially 0000. The fixed-length code word for the matching row is read out of column 18 of memory 10 and stored in register 68–2. The new group number was read out of column 52 of memory 10 and entered into register 104–1 and the new coding set number was read out of column 54 of memory 10 and was transferred to register portion 106. Thus, the decoded 8-bit code word is now stored in register portion 68–2.

When single-shot circuit 384 goes off, single-shot circuit 386 is turned on producing the D–10 pulse which is transmitted via cable 262 to gate 388 in FIG. 4D to gate the code word in register 68–2 to the output device. When single-shot 386 goes off, the pulse is transmitted through OR circuit 390 to turn on single-shot 392 to produce the D–11 pulse which is transmitted to cable 262, OR circuit 394 (FIG. 4F) and shifts the argument register portion 108–1 1 bit to the right. The D–11 pulse is also transmitted to OR circuit 336 and lead 338 (FIG. 4G) to decrement the length register portion 110 by 1. When single-shot 392 goes off, single-shot 396 is turned on to produce the D–12 pulse which is transmitted through cable 262 and OR circuit 360 to gate 362 (FIG. 4F) in order to gate in the next bit from the input device. The D–12 pulse is also applied to delay circuit 364 in order to signal the input device that another bit can be applied to the input leads extending into gate 362.

When single-shot 396 goes off, single-shot 398 is turned on producing the D–13 pulse which is transmitted through cable 264 to gate 400 of FIG. 4G to test the length register portion 110. If register portion 110 is not zero, a pulse will appear on lead 242 which is transmitted through cables 320 and 402 and OR circuit 390 of FIG. 4E. The output of OR circuit 390 turns on single-shot 392 so that the D–11, D–12 and D–13 pulses will again be produced until register portion 110 is at zero. If the register portion 110 is zero, a pulse will appear on lead 244 which is applied to AND circuits 404 and 406.

If the word counter 254 is 0, AND circuit 406 will have an output which signals the end of the decode operations. If word counter 254 is not zero, a pulse will appear on lead 246 which is transmitted to cable 320 and 402 to turn on single-shot 408 to produce pulse D–14. The D–14 pulse is transmitted through cable 262, OR circuit 346 and lead 348 to gate 350 (FIG. 4E) in order to transfer the coding number set indicator bit of register portion 106 to register portion 112. The D–14 pulse is also transmitted through OR circuit 340 and wire 342 where it is applied to gate 344 in order to gate the group number from register portion 104–1 to register portion 104–2 where it is applied to converter 248. Thus, the new group number and new coding set number are available for the next decode operation.

Figure 5:
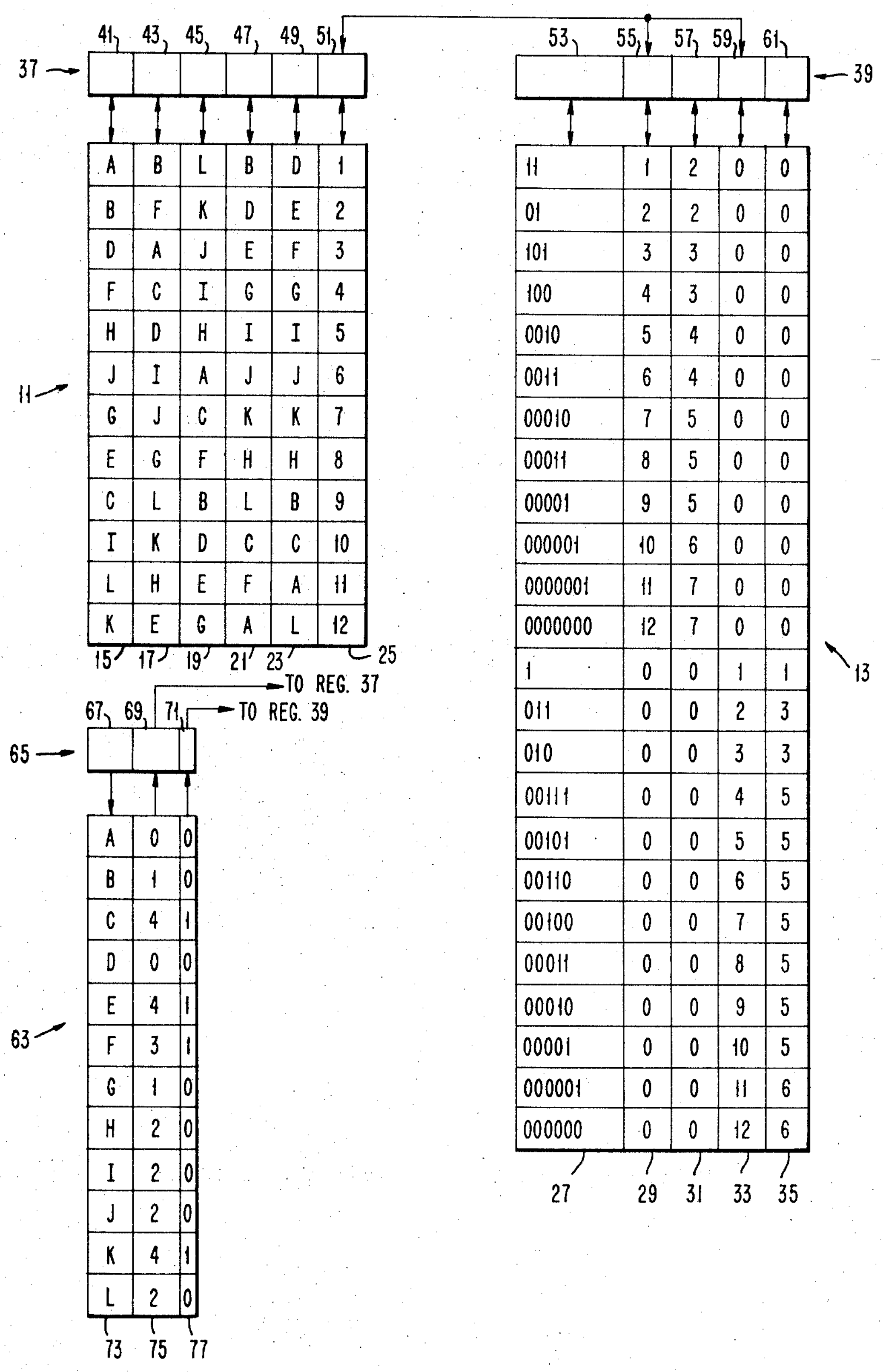
FIG. 5 is a schematic block diagram of another embodiment of a code processor according to the principles of the present invention.

In FIG. 5, a second, somewhat different processor, is provided wherein there is an overlap of operation in the decode mode. The decoding operation is thus faster; however, additional structure is required.

Referring to FIG. 5, a schematic block diagram of two memory units 11 and 13 is shown. The memory units are associative types similar to those shown in FIG. 3. Memory 11 is shown containing the 12 characters comprising the data set arranged into five groups in columns 15, 17, 19, 21 and 23 which represent groups 0, 1, 2, 3 and 4, respectively. Column 25 contains the addresses for the rows. In actual implementations the data is represented in binary form, however, for clarity, it is shown in FIG. 5 in alphanumeric form.

In memory 13, column 27 contains the code words arranged in two sets. The upper 12 rows of columns 29 and 31 contain the addresses and word lengths, respectively. The addresses and word lengths are also stored in the lower 12 rows of columns 33 and 35, respectively. The lower 12 rows of columns 29 and 31 and the upper 12 rows of columns 33 and 35 are filled with zeros. The upper 12 rows of code words in memory 13 represent coding set 0 and the lower 12 rows represent coding set 1; however, the coding set notations themselves are not stored.

Register 37 is associated with memory 11 and register 39 is associated with memory 13 and each contains portions for each column of the memories. Register portions 55 and 57 are used for the address and length respectively for coding set zero and register portions 59 and 61 are used for the address and length respectively for coding set 1. In the encode operation, a group 0 and coding set 0 is arbitrarily selected for the first word to be encoded. The first word, for example "B," is fed into all the portions 41 through 49 of register 37. Since the group is 0, the register is preset such that only the "B" in portion 41 is matched on column 15 (for group 0). The word will match on the second row and the address "2" is read out into portion 51. The address "2" is transferred from portion 51 into portions 55 and 59 of register 39. Portions 57 and 61 of register 39 which are associated with the "length" numbers initially contain zeros. Since the coding set is 0, register 39 is preset such that the address in portion 55 is compared on column 29 and the address in portion 59 is not compared. The zero contents of "length" register portion 61 is also compared on column 35 (portion 61 is related to coding set 1). Normally, the address will match only one corresponding word in memory, for example address "2" in portion 55 will match on the second row. However, there is one address word in the address set which consists of all zeros and will also match on the zeros in the lower portion of memory 13. For this reason, the zeros in portion 61 is also compared. They will not match on any word in the lower portion of column 35 thereby insuring that only the one correct row is matched. When a match occurs, such as on the second row for address "2," the corresponding code word 01 is entered into portion 53 of register 39. The corresponding length "two" is also entered into portion 57 and is used to increment the two bits out of portion 53 as an encoded word.

The group and coding set for the next word must be determined based on the identity of its preceding word. This is accomplished in a third memory unit 63 and register 65. At the same time the input data word (i.e., "B") is entered into portion 41 of register 37, it is also entered into portion 67 of register 65. Column 73 of memory 63 contains the characters of the data set (in binary code) and columns 75 and 77 contain the related group and coding set indication numbers, respectively. Thus, the "B" in portion 67 will match on the B stored in row 2 and provide the group 1 and coding set 0 which are read into portions 69 and 71 of register 65. The group 1 is used to preset register 37 such that only the next word in portion 43 is compared and the coding set number 0 is used to preset register 39 so that only the contents of portions 55 and 61 will be compared.

The next character, for example "F," is entered into all the portions of register 37 and is compared only with column 43. A match occurs on the second row producing an address "2" which is entered into portions 55 and 59 of register 39 but only register portion 55 will be compared on column 29 (because the coding set 0 preset register 39). The zeros in portion 61 will also be compared and a match will occur on the second row to produce the code word 01 which is entered in portion 53 along with length 2 and incremented out as an encoded word. Meanwhile, the data word "F" has been compared in memory 63 to produce group 3, coding set 1 for the next data word. All subsequent input data words are encoded in the same manner. It should be noted that for a coding set number 1, register portion 59 is compared with column 33 and the zeros in column 57 are compared with column 31.

To decode, a group 0 and coding set number 0 is selected for the first word. This means that only portion 41 of register 37 will receive a word and the information only in portions 55 and 57 of register 39 will be read out. Initially, portion 53 of register 39 is filled with input data bits and a compare is made on column 27. It is possible that two matches may occur, for example if the word is 00001 a match will occur on the ninth and 22 rows. Thus, addresses may be read into both portions 55 and 59 and matched word lengths may be read into both portions 57 and 61. The coding set number determines which portions are to be read out. For coding set 0, the address in portion 55 is read out and the length in portion 57 increments portion 53 to increment the matched bits and refill portion 53 of register 39.

The address from portion 55 of register 39 is transferred to portion 51 of register 37 and compared with column 25. When a match occurs, only the word from column 15 is read into portion 41 of register 37 because the group is 0. Meanwhile, new bits can be entered in portion 53 of register 39 and can be compared with column 27 of memory 13 to begin decoding the next word and new addresses and word lengths can be entered into portions 55, 57, 59 and 61. The word entered into portion 41 of register 37 after the match in memory 11 is the decoded word. This word is entered into portion 67 of register 65 and is compared with column 73 to provide the new group and coding set number from columns 75 and 77. The new coding set number is used to determine which of the portions 55, 57 or 59, 61 of register 39 are to be read out. The new group is used to determine which portion of register 37 will contain the new decoded word after a match produced by the new address from the selected portion 55 or 59 of register 39. The subsequent variable-length words are decoded in the same manner.

The advantage of the processor of FIG. 5 is that in the decoding mode a new compare and match may be performed in memory 13 at the same time that memory 11 and memory 63 are processing the previous information. Since the processor of FIG. 5 is similar to the processor shown in FIG. 3 and in the detailed embodiment, one skilled in the art should be able to implement the processor of FIG. 5 and no detailed embodiment is provided herein.

What has been described in a processor for encoding and decoding variable-length dependent codes wherein the words of the code are arranged in memory units in groups and coding sets and the groups and coding sets used for processing the data words are determined by preceding data words.

While the invention has been particularly shown and described with reference to a preferred embodiment thereof, it will be understood by those skilled in the art that various changes in form and details may be made therein without departing from the spirit and scope of the invention.

What is claimed is:

1. A processor for encoding a fixed-length code word of a code alphabet wherein all the code words have the same number of code elements into a variable-length code word of a code alphabet wherein the code words have different numbers of code elements, and decoding a variable-length code word into a fixed-length code word comprising:

a first memory unit having stored therein all the fixed-length code words of a code alphabet, each of said fixed-length code words being stored in combination with M address words where M is an integer, each of said M address words being assigned into a separate one of M code groups, each of said fixed length code words also being stored in combination with a code group number designating one of said M code groups and a coding set number designating a coding set, a second memory unit having stored therein variable-length code words of a code alphabet, said variable-length code words being stored in N separate coding sets where N is an integer, each of said variable-length code words in said coding sets being stored in combination with a coding set number indicating the coding set and an address word corresponding to an address word in said first memory unit, first input means connected to said first memory unit for comparing an input fixed length code word of said code alphabet with said fixed length code words stored in said first memory unit for obtaining a match on a corresponding one of said stored fixed-length code words, first output means for reading out from a previously selected one of said M code groups of said first memory unit the address word stored in combination with said matched fixed-length code word, second input means connected to said second memory unit for comparing said address word read out from said first memory unit and a previously selected coding set number with said address words and said coding set numbers stored in said second memory unit for obtaining a match on a corresponding one address word and coding set number, and second output means for reading out of said second memory unit said variable length code word stored in combination with said matched address word and coding set number.

2. A processor according to claim 1 wherein said first output means also reads out the code group number and coding set number stored in combination with said matched fixed-length code word in said first memory unit, and further including means for storing said code group number and said coding set number read out of said first memory unit for designating one of said M code groups and one of said N coding sets for use with a subsequent input fixed-length code word.

3. A processor according to claim 1 wherein said second memory unit has stored therein a length indicating word stored in combination with each of said variable-length code words for indicating the number of code elements in said variable-length code word stored in combination therewith, and said second output means further including means for transmitting from said second output means the code elements of said variable-length code word read out of said second memory unit, said number of code elements transmitted being controlled by said length indicating word stored in combination therewith.

4. A processor according to claim 1 wherein said first memory unit is a two-state associative memory device and wherein said second memory unit is a three-state associative memory device.

5. A processor according to claim 1 further including means connected to said second memory unit for comparing an input variable-length code word and a previously selected coding set number with said variable-length code words and said coding set numbers stored in said second memory unit for obtaining a match on a corresponding variable-length code word and coding set number, means for reading out of said second memory unit said address word stored in combination with said matched variable-length code word and coding set number, means for comparing said address word read out of said second memory unit with the address words stored in a previously selected one of said M code groups in said first memory unit for obtaining a match on one of said address words, and means for reading out of said first memory unit the fixed-length code word stored in combination with said matched address word.

6. A processor according to claim 5 wherein said means for reading out said fixed-length code word from said first memory unit also reads out the code group number and coding set number stored in combination with said matched address word, and further including means for storing said code group number and coding set number read out of said first memory unit for designating one of said M code groups and one of said N coding sets for use with a subsequent input variable length word.

7. A processor according to claim 5 wherein said second memory unit has stored therein a length indicating word stored in combination with each of said variable-length code words for indicating the number of code elements in said variable-length code word stored in combination therewith, and wherein said means for comparing said input variable-length code word in said second memory unit further includes means for removing from said comparing means the code elements of said input variable-length code word, said number of code elements removed from said comparing means being controlled by said length indicating word stored in combination with said matched corresponding variable-length code word.

8. A processor for encoding a fixed-length code sword of a code alphabet wherein all the code words have the same number of code elements into a variable-length code word of a code alphabet wherein the code words have different numbers of code elements, and decoding a variable-length code word into a fixed-length code word comprising, a first associative memory device having a plurality of storage locations functionally arranged in rows and columns, said storage locations including two-state storage elements, a first column of said first memory having fixed-length code words of a code alphabet stored on separate rows thereof, M columns of said first memory each having address words stored in separate rows thereof, a further column of said first memory having code group number stored in separate rows thereof, a still further column of said first memory having coding set numbers stored in separate rows thereof such that each row of said first memory contains a fixed-length code word, M address words, a code group number and a coding set number, a second associative memory device having a plurality of storage locations functionally arranged in rows and columns, a first one of said columns having rows of storage locations including three-state storage elements, said first one of said columns of said second memory having the variable-length code words of a variable-length code alphabet arranged in N coding sets and stored in separate rows thereof, a second column of said second memory having the coding set numbers of said coding sets stored in storage locations in separate rows thereof, a third column of said second memory having length words stored in storage locations in separate rows thereof, each of said length words indicating the numbers of code elements of the variable-length code word stored in the same row, a fourth column of said second memory having address words stored in storage locations in separate rows thereof, said address words corresponding to said address words stored in said first memory, first input means connected to said first memory device for comparing an input fixed-length code word of said code alphabet with said fixed-length code words in said first column for obtaining a match with a corresponding fixed-length word in a row, first output means connected to said first memory device for reading out from a previously selected one of said M columns the address word stored in said matched row thereof, second input means connected to said second memory device for comparing said address word read out from said first memory device and a previously selected coding set number with said address words stored in said fourth column and said coding set numbers stored in said second column of said second memory device for obtaining a match on corresponding words in a row, and second output means connected to said second memory device for reading out from said first column thereof the variable-length code word stored in said matched row thereof.

9. A processor according to claim 8 wherein said first output means also reads out from said further column the code group number stored in said matched row and from said still further column the coding set number stored in said matched row, and further including means for storing said code group number and coding set number read out of said first memory device for designating one of said M code groups and one of said N coding sets for use with a subsequent input fixed-length code word.

10. A processor according to claim 8 wherein said second output means also reads out from said third column of said second memory device the length indicating word stored in said matched row, said second output means further including means for transmitting from said second output means the code elements of said variable-length code word read out of said second memory unit, said number of code elements transmitted being controlled by said length indicating word from said matched row.

11. A processor according to claim 8 further including means connected to said second memory device for comparing an input variable-length code word of said code alphabet with said variable-length code words in said first one of said columns of said second memory device and for comparing a previously selected coding set number with the coding set numbers stored in said second column for obtaining a match with a corresponding variable-length code word and coding set number in a row, means for reading out the address word stored in said matched row, means for comparing said address word read out of said second memory device with the address words stored in a previously selected one of said M columns of said first memory device for obtaining a match on a row thereof, and means for reading out of said first column of said first memory device the fixed-length code word stored in said matched row.

12. A processor according to claim 11 wherein said means for reading out said fixed-length code word from said matching row of said first memory device also reads out the code group number and coding set number stored in said matched row, and further including means for storing said code group number and said coding set number read out of said matched row for designating one of said M columns of said first memory device and one of said N coding sets of said second memory device for use with a subsequent input variable-length word.

13. A method of encoding a fixed-length code word of a code alphabet wherein all the code words have the same number of code elements into a variable-length code word of a code alphabet wherein the code words have different numbers of code elements, and decoding a variable-length code word into a fixed-length code word comprising the steps of:

storing in a first memory unit therein all the fixed-length code words of a code alphabet, each of said fixed-length code words being stored in combination with M address words where M is an integer, each of said M address words being assigned into a separate one of M code groups, each of said fixed length code words also being stored in combination with a code group number designating one of said M code groups and a coding set number designating a coding set, storing in a second memory unit variable-length code words of a code alphabet, said variable-length code words being stored in N separate coding sets where N is an integer, each of said variable-length code words in said coding sets being stored in combination with a coding set number indicating the coding set and an address word corresponding to an address word in said first memory unit, comparing an input fixed length code word of said code alphabet with said fixed length code words stored in said first memory unit for obtaining a match on a corresponding one of said stored fixed-length code words, reading out from a previously selected one of said M code groups of said first memory unit the address word stored in combination with said matched fixed-length code word, comparing said address word read out from said first memory unit and a previously selected coding set number with said address words and said coding set numbers stored in said second memory unit for obtaining a match on a corresponding one address word and code set number, and reading out of said second memory unit said variable-length code word stored in combination with said matched address word and coding set number.

14. A method according to claim 13 also including the steps of reading out the code group number and coding set number stored in combination with said matched fixed-length code word in said first memory unit, and storing said code group number and said coding set number read out of said first memory unit for designating one of said M code groups and one of said N coding sets for use with a subsequent input fixed-length code word.

15. A method according to claim 13 further including the steps of comparing an input variable length code word and a previously selected coding set number with said variable-length code words and said coding set numbers stored in said second memory unit for obtaining a match on a corresponding variable-length code word and coding set number, reading out said address word stored in combination with said matched variable-length code word and coding set number, comparing said address word read out of said second memory unit with the address words stored in a previously selected one of said M code groups in said first memory unit for obtaining a match on one of said address words, and reading out of said first memory unit the fixed-length code word stored in combination with said matched address word.

16. A method according to claim 15 further including the steps of reading out the code group number and coding set number stored in combination with said matched address word, and storing said code group number and coding set number read out of said first memory unit for designating one of said M code groups and one of said N coding sets for use with a subsequent input variable-length word.

* * * * *